(12) United States Patent
Martinozzi et al.

(10) Patent No.: US 11,922,167 B2
(45) Date of Patent: Mar. 5, 2024

(54) METHOD PERFORMED BY A MICROCONTROLLER FOR MANAGING A NOP INSTRUCTION AND CORRESPONDING MICROCONTROLLER

(71) Applicant: SK hynix Inc., Gyeonggi-do (KR)

(72) Inventors: Giulio Martinozzi, Agrate Brianza (IT); Federica Arosio, Agrate Brianza (IT); Lorenzo Di Lalla, Agrate Brianza (IT)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/173,782

(22) Filed: Feb. 24, 2023

(65) Prior Publication Data
US 2023/0195460 A1  Jun. 22, 2023

Related U.S. Application Data

(62) Division of application No. 17/465,654, filed on Sep. 2, 2021, now Pat. No. 11,614,938.

(30) Foreign Application Priority Data

Feb. 5, 2021  (IT) .......................... 102021000002642

(51) Int. Cl.
*G06F 9/30* (2018.01)

(52) U.S. Cl.
CPC ...... *G06F 9/30069* (2013.01); *G06F 9/30054* (2013.01); *G06F 9/30058* (2013.01); *G06F 9/30076* (2013.01); *G06F 9/30145* (2013.01); *G06F 9/30181* (2013.01)

(58) Field of Classification Search
CPC ............. G06F 9/30069; G06F 9/30054; G06F 9/30058; G06F 9/30076; G06F 9/30145; G06F 9/30181; G06F 9/3836; G06F 9/223
See application file for complete search history.

(56) References Cited

U.S. PATENT DOCUMENTS

2012/0254666 A1* 10/2012 Liu ..................... G06F 11/3636
714/E11.178

* cited by examiner

*Primary Examiner* — Corey S Faherty
(74) *Attorney, Agent, or Firm* — IP&T GROUP LLP (57) ABSTRACT

Disclosed herein is a method for managing of NOP instructions in a microcontroller, the method comprising duplicating all jump instructions causing a NOP instruction to form a new instruction set; inserting an internal NOP instruction into each of the jump instructions; when a jump instruction is executed, executing a subsequent instruction of the new instruction set; and executing the internal NOP instruction when an execution of the subsequent instruction is skipped.

3 Claims, 12 Drawing Sheets

| | | Microcontroller with signal MC_MICRO_INTNOP_SKIP (Micro 1) | | | Microcontroller with duplicated JMP instructions (Micro 2) | | |
|---|---|---|---|---|---|---|---|
| | | Writing (internal NOP instruction disabled) | Executing Condition T | Executing Condition F | Writing | Executing Condition T | Executing Condition F |
| Case 1 | | TEST(C); IF (C==1) THEN GOTO L_true; I1; I2f; ... ... L_true: I2t; | TEST; JMP; I1; I2t; | TEST; NO JMP; I1; I2f; | TEST(C); IF (C==1) THEN GOTO L_true; I1; I2f; ... ... L_true: I2t | TEST; JMP; I1; I2t; | TEST; NO JMP; I1; I2f; |
| Case 2 | | I0;TEST(C); I1; IF (C==1) THEN GOTO L_true; NOP; I2f; ... ... L_true: I2t; | I0;TEST; I1; JMP; NOP; I2t; | I0; TEST; I1; NO JMP; NOP; I2f; | I0;TEST(C); I1;IF (C==1) THEN GOTO L_true; I2f; ... ... L_true: I2t | I0,TEST; I1; JMP; NOP; I2t; | I0; TEST; I1; NO JMP; NOP; I2f; |

FIG. 4B

| | Written code | Executed code with c = 0 | Executed code with c = 1 |
|---|---|---|---|
| Case 1 where INST2 has to be executed both for c = 0 and for c = 1 | 1: TEST(c)<br>2: INST1; IF (c==1) THEN GOTO label_0;<br>3: INST2;<br>4: INST4<br>...<br>n: label_0: INST3 | 1: TEST<br>2: INST1 (no GOTO)<br>3: INST2<br>4: INST4 | 1: TEST<br>2: INST1; (GOTO)<br>3: INST2<br>4: INST3 |
| Case 2 where INST2 has to be executed only if c = 0 | 1: TEST(c)<br>2: INST1; IF (c==1) THEN GOTO label_0;<br>3: INST2;<br>4: INST4<br>...<br>n: label_0: INST3 | 1: TEST<br>2: INST1 (no GOTO)<br>3: INST2<br>4: INST4 | 1: TEST<br>2: INST1; (GOTO)<br>3: INST2<br>4: INST3 |

METHOD PERFORMED BY A MICROCONTROLLER FOR MANAGING A NOP INSTRUCTION AND CORRESPONDING MICROCONTROLLER

CROSS-REFERENCE TO RELATED APPLICATION

This application is a division of U.S. patent application Ser. No. 17/465,654 filed on Sep. 2, 2021, which claims priority under 35 U.S.C. § 119 to Italian patent application No. 102021000002642, filed on Feb. 5, 2021, the disclosure of which is hereby incorporated in its entirety by reference herein.

BACKGROUND

1. Technical Field

The present disclosure relates to a method performed by a microcontroller for managing a no operation (NOP) instruction and a corresponding microcontroller.

2. Related Art

Among various types of flash memory devices, NAND-type flash memory devices are increasingly being used as a high capacity data storage media. Each cell of a flash memory needs to be programmed to store information by trapping electrons in the floating gate. The programming operation is performed by driving a strong positive voltage on the control gate to force a current to flow from the channel through the floating gate to the control gate, which is called the "Fowler Nordheim Tunneling" effect. A control gate terminal is connected to a word line of the flash memory, and a voltage is provided to the control gate terminal through the word line. Similarly, the reading operation is performed by applying suitable voltages to the control gate of the cell to be read.

Suitable read and program codes are executed by a microcontroller in order to perform the needed instructions corresponding to reading and programming phases of a memory device. More particularly, the read and program codes comprise the instruction to be executed in order to obtain a correct voltage to be applied to a chosen cell of the memory device. Within these codes, no operation (NOP) instructions may occur.

As it is well known, a NOP instruction is a command that instructs nothing. Hence, when an internal NOP instruction occurs, the NOP instruction is wasted when the microcontroller operates.

U.S. Pat. No. 9,323,535 in the name of Intel Corporation relates to a processor including an instruction fetch unit, and allows an enforcement instruction and the other subsequent instructions in program order to progress or advance through the pipeline and be treated as a non-operation (NOP) instruction at a subsequent stage of the input of the enforcement instruction.

Similarly, U.S. Pat. No. 9,703,948 also in the name of Intel Corporation relates to a processor including a decode unit which decodes a return target restrictive return (or RTR return) from a procedure instruction that may execute as a NOP instruction.

SUMMARY

Embodiments of the present disclosure are directed to a method and microcontroller for managing a NOP instruction by duplicating all jump instructions causing a NOP instruction.

In an embodiment of the present disclosure, the method comprises duplicating all jump instructions causing a NOP instruction to form a new instruction set; inserting an internal NOP instruction into each of the jump instructions; when a jump instruction is executed, executing a subsequent instruction of the new instruction set; and executing the internal NOP instruction when an execution of the subsequent instruction is skipped.

More particularly, the executable instructions of the new instruction set are sub-divided into a plurality of sub-sets including output modification instructions, logic-algebraic instructions and flow instructions. The microcontroller is able to simultaneously execute two instructions of different sub-sets. Moreover, each code line including more than two instructions is subdivided into two line code including two instructions of two different sub-sets.

In another embodiment of the present disclosure, the method comprises removing nonessential instructions, such as the unused instructions, in response to the NOP instruction and duplicating the most used instructions with a Jump instruction, inserting the most used instructions and the Jump instruction in place of (in the location of) the nonessential instructions so as not to waste code lines.

More particularly, the method comprises identifying a first group of nonessential instructions and a second group of jump instructions causing a NOP instruction; and duplicating instructions of the second group by inserting a jump instruction in place of a nonessential instruction of the first group.

In an embodiment, inserting a jump instruction of the second group in place of a nonessential instruction of the first group may form a new instruction set of the code, the code line of the not used instruction being used to code the added jump instructions.

Moreover, the method may comprise a step of removing a NOP instruction after a goto, call, or return instruction by using an internal NOP code signal, which may be provided internally by the microcontroller.

In an embodiment of the present disclosure, a NOP manager unit of a microcontroller using codes requiring NOP instructions, the NOP manager unit comprising an instruction decoder combiner block connected to an output terminal of the NOP manager unit and having an internal output terminal providing an internal NOP code signal; and an instruction decoder sequence block having an input terminal receiving memory instructions and an output terminal connected to the output terminal of the NOP manager unit, the instruction decoder sequence block also receiving the internal NOP code signal from the instruction decoder combiner block.

In an embodiment, the instruction decoder sequence block may comprise at least a MUX having a first input terminal receiving the memory instructions and a second input terminal receiving a idle instruction NOP code, as well as an output terminal connected to the output terminal of the NOP manager unit, the MUX being driven by the internal NOP code signal received by the internal output terminal of the instruction decoder combiner block.

The instruction decoder sequence block may further comprise a data latch which receives the clock signal of the microcontroller and is connected to the output terminal of the NOP manager unit to provide an internal memory instruction.

The NOP manager may further comprise an additional internal latch, inserted between the instruction decoder combiner block and the instruction decoder sequence block, the additional internal latch receiving the clock signal and the reset signal of the microcontroller and providing at a further internal output terminal a further internal skip signal to the instruction decoder sequence block. More particularly, the additional internal latch is sampling at the negative edge of the clock signal.

In another embodiment of the present disclosure, a microcontroller using codes requiring NOP instructions is provided, the microcontroller including a pipeline for managing a plurality of instructions of a code to be used by the microcontroller, the plurality of instructions including jump instructions causing corresponding NOP instructions; and a NOP manager unit. The NOP manager unit comprises an instruction decoder combiner block connected to an output terminal of the NOP manager unit and having an internal output terminal providing an internal NOP code signal; and an instruction decoder sequence block having an input terminal receiving memory instructions and an output terminal connected to the output terminal of the NOP manager unit and configured to receive the internal NOP code signal from the instruction decoder combiner block.

In another embodiment of the present disclosure, a microcontroller using codes requiring NOP instructions is provided, the microcontroller including a pipeline configured to manage a plurality of instructions of a code to be used by the microcontroller, the plurality of instructions including jump instructions causing corresponding NOP instructions and each of the jump instructions coded to include an internet NOP instruction; and a NOP manager unit configured to, when one among the jump instructions is executed: execute a subsequent one among the instructions; or execute the internal NOP instruction when the subsequent instruction cannot be executed.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

The characteristics and advantages of the present disclosure will be apparent from the following description of embodiments thereof given by way of indicative and non-limiting examples with reference to the annexed drawings, in which.

DETAILED DESCRIPTION

Hereinafter, embodiments of the present disclosure will be described. In drawings, thicknesses and distances are expressed for convenience of description, and may be exaggerated and illustrated as compared with actual physical thicknesses and distances. In the present specification, a known configuration unrelated to the present disclosure may be omitted. In the specification, when reference numerals are annotated to components in each drawing, it should be noted that like reference numerals denote like elements even though they are depicted in several drawings.

Figure 1A:
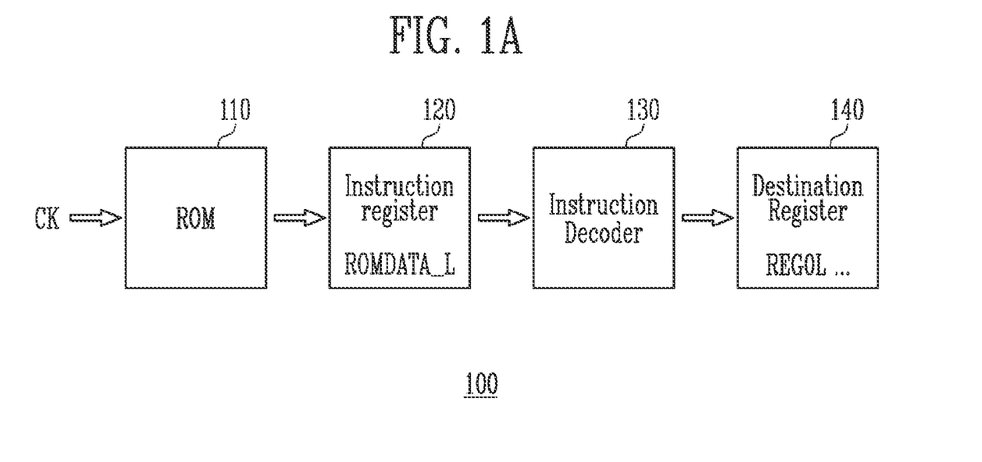
FIG. 1A illustrates a pipeline structure for processing a plurality of instructions of a read or program code according to an embodiment of the present disclosure.

FIG. 1A is a pipeline structure 100 wherethrough a plurality of instructions are read, stored, decoded and executed in a sequence of blocks, driven by a clock signal CK, able to manage a plurality of instructions as shown.

In an embodiment, the pipeline structure 100 comprises a memory block, for example, a ROM memory 110 receiving an address signal ROM_ADD corresponding to a plurality of memory instructions I stored as ROM_DATA in ROM memory 110. The memory instructions I are read by ROM memory 110 and stored in a further block of the pipeline structure 100, in particular an instruction register 120, connected to the ROM memory 110 and receiving therefrom the memory instructions I and storing a corresponding latched instruction ROMDATA_L also indicated as register instructions E.

In an embodiment, the pipeline structure 100 may also comprise an instruction decoder 130, being connected to the instruction register 120 and receiving therefrom the register instructions E being decoded and sent to a final destination register 140, being connected to the instruction decoder 130 storing the final instructions R to be executed.

Most often microcontrollers are able to simultaneously execute up to two sub-instructions for each clock cycle; in particular, when the bits number of the instruction are lower or equal to resources number that the microcontroller can handle, the executable instructions are divided into three possible sub-sets: output modification instructions or PORT, such as SET/CLEAR of an output port; logic-algebraic instructions or ALU, such as TEST, SUM, AND, OR et al.;

and flow instructions or jump (JMP), such as GOTO to a label, CALL a subroutine, RETURN from a subroutine.

In this way, the microcontroller is able to simultaneously execute two sub-instructions according to the following grouping: PORT and JMP; or PORT and ALU; or ALU and JMP.

It should be clarified that jump instructions, in the following, are intended to include all the instructions that force the microcontroller to deviate from a sequential instruction flow, in which the next statement to be executed is an instruction stored at the very next memory address, and make the microcontroller read from another memory position.

Figure 1B:
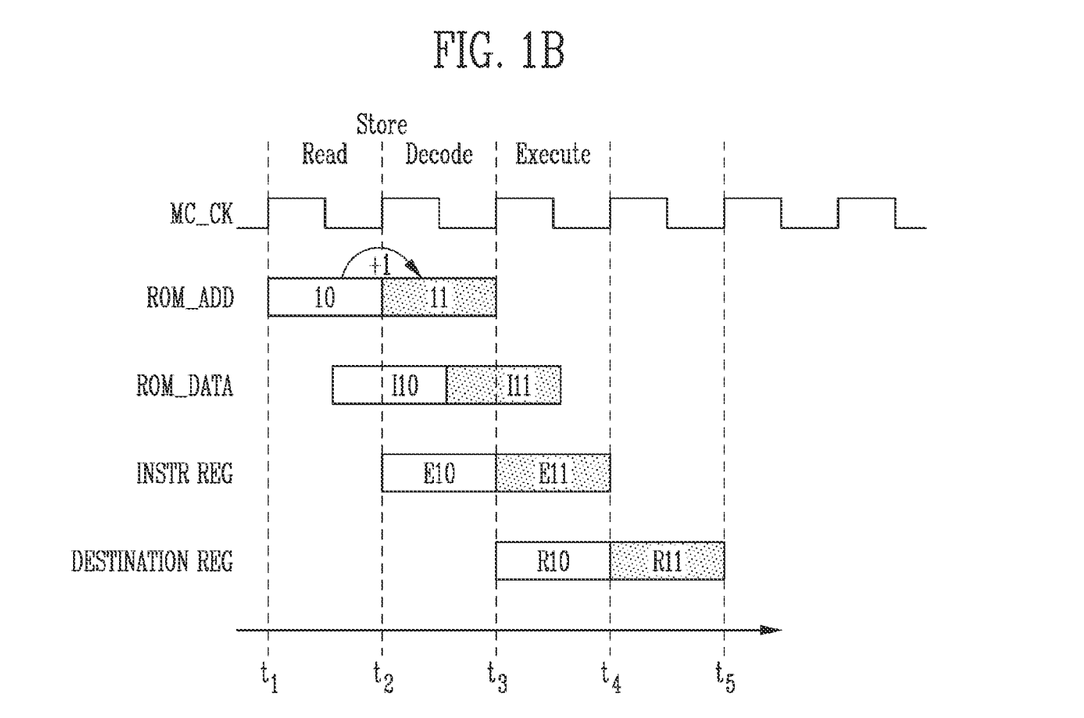
FIG. 1B illustrates a time diagram of the plurality of instructions processed by the pipeline structure of FIG. 1A according to an embodiment of the present disclosure.

In the example shown in the FIG. 1B, at a first time t1, being the beginning of a read interval, a first address signal ROM_ADD having for instance a value of 10 is read by the ROM memory 110 and a corresponding first memory instruction I10 is retrieved and stored in the instruction register 120. At a second time t2, being the end of the read interval and the beginning of a decode interval, a first register instruction E10 is retrieved by the instruction register 120 and sent to the instruction decoder 130, which, at a third time t3 being the end of the decode interval and the beginning of an execute interval, provides a first final instruction R10. More particularly, the execution of the final instruction R10 makes a change in a destination register which can be internal or external to the microcontroller.

At the second time t2, a subsequent second address signal ROM_ADD having a value of 11 is read and a subsequent second memory instruction I11 is received by the ROM memory 110, the pipeline structure 100 processing the second memory instruction I11 in the same way as the first memory instruction I10.

Figure 2:
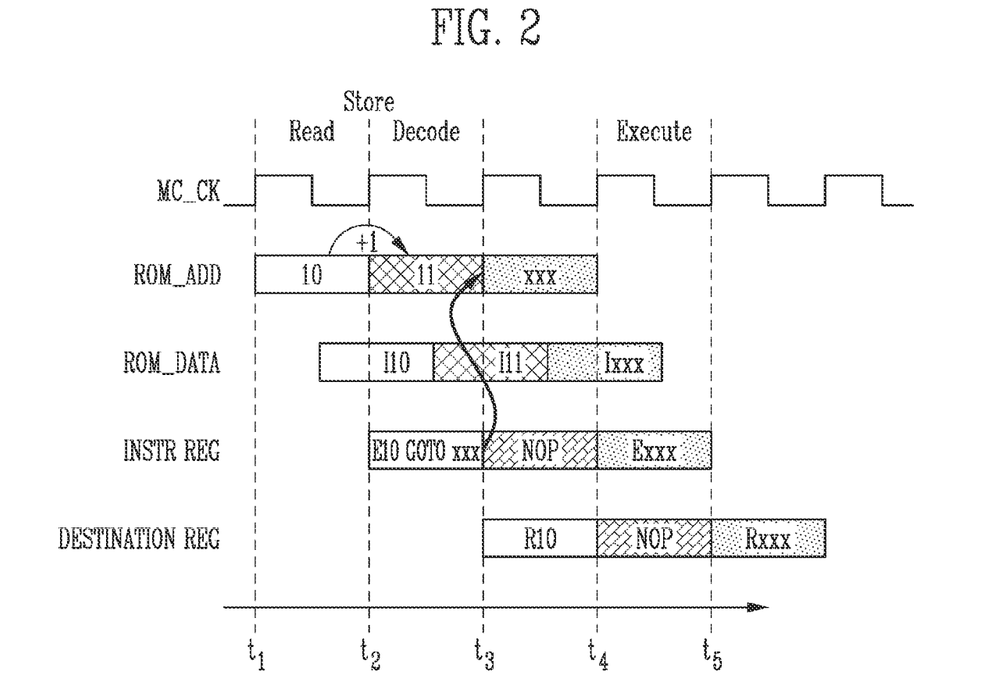
FIG. 2 illustrates a time diagram of the plurality of instructions in case of jump instruction involving a NOP instruction according to an embodiment of the present disclosure.

When instructions comprise a jump command, as shown for instance in FIG. 2 for the first register instruction E10 at the third time t3 and a GOTO instruction, the second memory instruction I11 is retrieved by the ROM memory 110, a corresponding read command at the address 11 being executed at the second time t2 while the jump instruction is being decoded. In this case, the second memory instruction I11 is then dropped and a NOP instruction is stored in the instruction register 120 at its place at the third time t3, when the new instruction at address xxx is being read from the ROM memory 110. The corresponding final instruction R10 should be thus followed by the NOP instruction so as to provide an internal idle cycle to reload the pipeline structure 100.

It is however clear that the inserted NOP instruction after each register/final instruction corresponding to a jump command is a wasted instruction that causes a greater execution time of a microcontroller using the pipeline structure 100 and the NOP instructions.

Figure 3A:
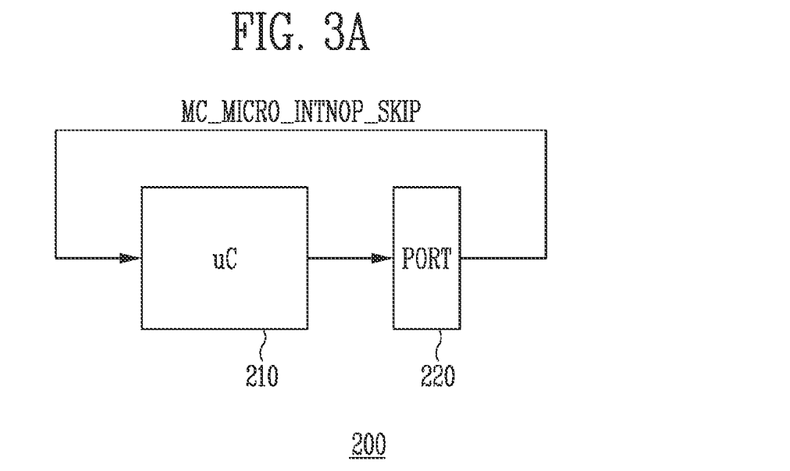
FIG. 3A illustrates a microcontroller using an internal signal to manage NOP instructions and FIG. 3B illustrates a corresponding time diagram of the plurality of instructions according to an embodiment of the present disclosure.
Figure 3B:
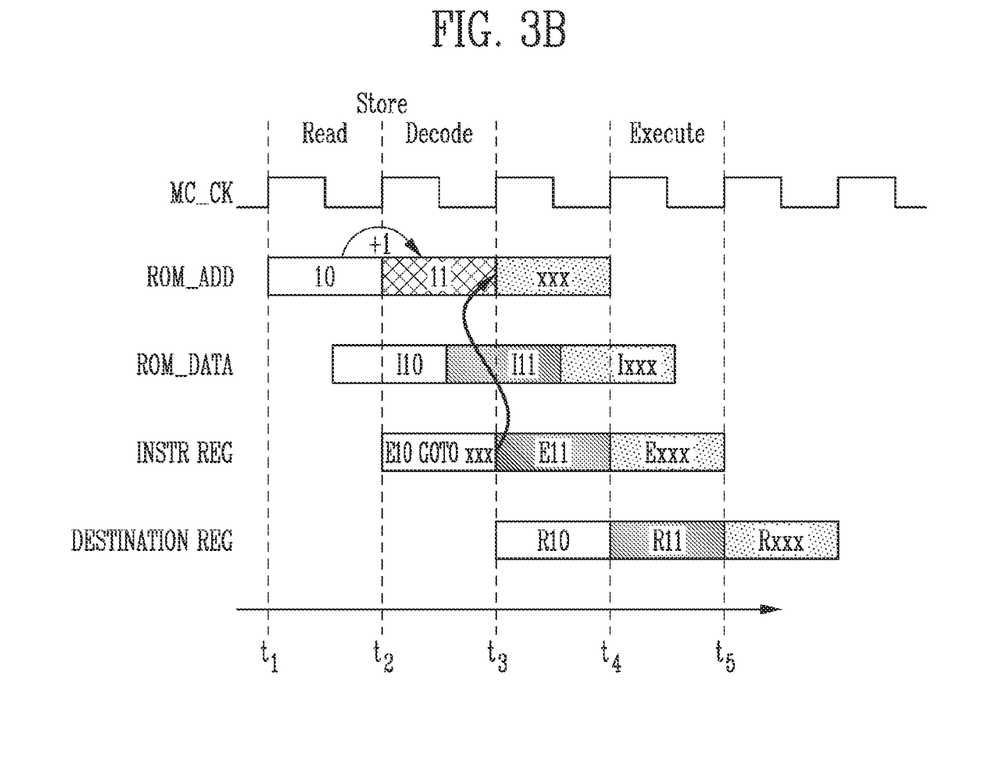

An additional specific signal could be in this case used to remove the internal NOP instruction after a jump instruction, as indicated schematically in FIG. 3A wherein a microcontroller skip circuit 200 is realized by connecting a microcontroller 210 with an output port 220 which provide the microcontroller 210 with a skipping signal MC_MICRO_INTNOP_SKIP and allows an instruction after a jump instruction to be executed. In particular, as indicated in FIG. 3B, even when the first register instruction E10 is a GOTO instruction, the second register instruction E11 and thus the second final instruction R11 are executed, thus reducing the execution time of the jump instruction.

In this way, the internal NOP instruction can be disabled due to the skipping signal MC_MICRO_INTNOP_SKIP, which can be set by the microcontroller itself during the execution time.

However, it can be verified that using the skipping signal MC_MICRO_INTNOP_SKIP changes the behavior of the execution of the jump instruction. In particular, two main issues arise.

Figure 4A:
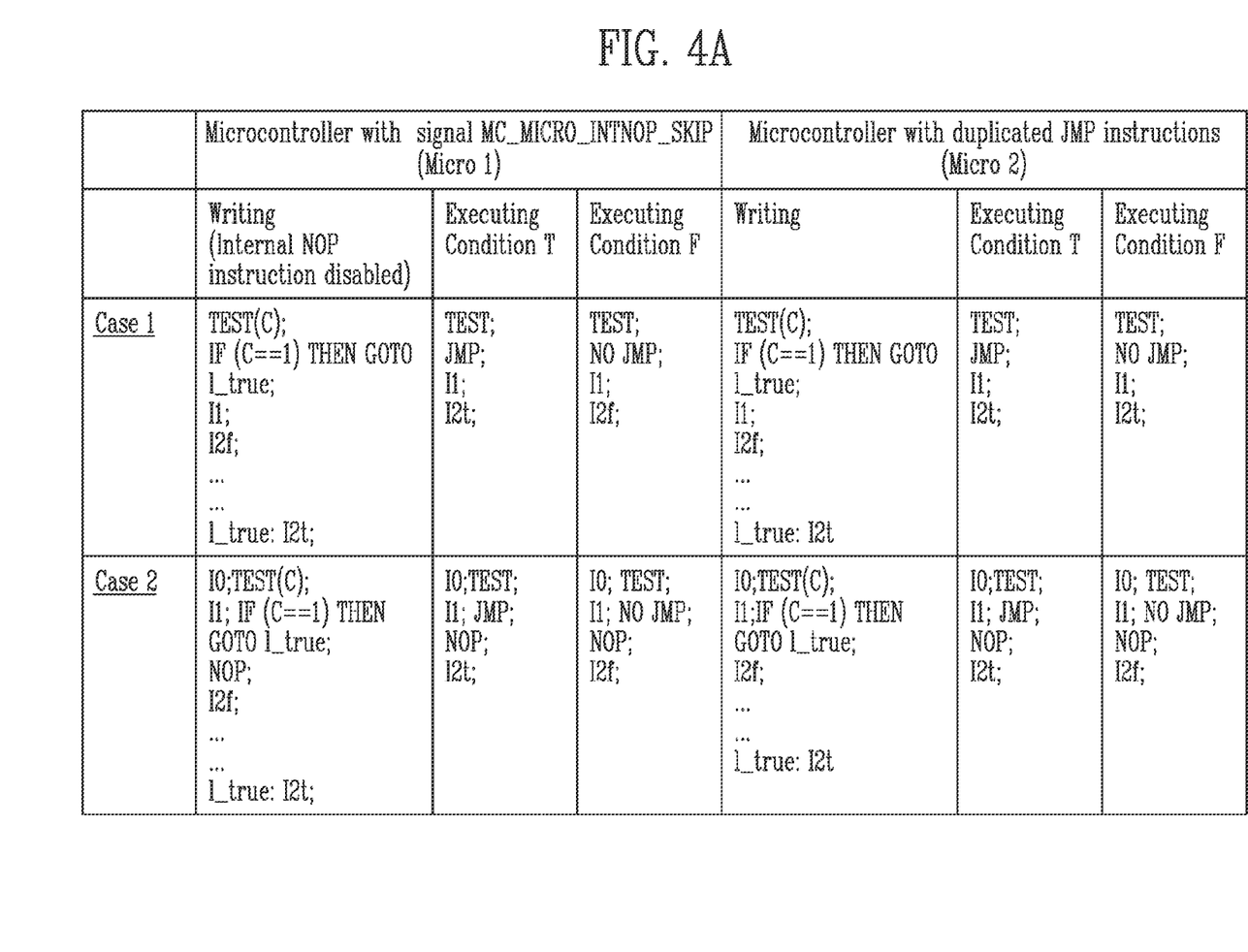
FIG. 4A and FIG. 4B illustrate code sequences corresponding to the microcontroller working with the internal signal of FIG. 3A or with the instruction set established by the method according to an embodiment of the present disclosure.

First, not all jump instructions can be managed by the internal skip circuit 200 using the skipping signal MC_MICRO_INTNOP_SKIP and explicit NOP instructions should be introduced after such instructions. In this case, a waste of instruction lines still occurs, and the benefit of the reduction of execution time is lost due to the increased code lines number, as shown for instance in FIG. 4A, comparing the code lines sequence without or with the skipping signal MC_MICRO_INTNOP_SKIP, respectively. Moreover, the increasing of the code lines number forces an increase to the ROM memory area.

Furthermore, since the behavior of a jump instruction depends whether or not of the skipping signal MC_MICRO_INTNOP_SKIP is set, it is impossible to understand the behavior of the code simply by reading it, the behavior being a matter of code quality.

Since the code execution depends on the state of the signal disabling the internal NOP instructions, such a code turns out to be not univocally decodable, thereby causing an increased number of errors during the design phase.

The method according to an embodiment comprises a duplication of all jump instructions to allow the execution of a subsequent instruction at the subsequent clock cycle or, inherently, an internal NOP instruction when the jump instructions are executed. In this way, the method provides for obtaining a new instruction set, including the duplicated jump instructions.

In this way, at each jump instruction, the code can be designed in such a way that a subsequent instruction can be executed or, in case this is not possible, the jump instruction itself could be written in order to include an internal NOP instruction, which does not need to be stored in the ROM memory 110 and thus does not require additional code lines.

For instance, consider a case wherein a sequence of two instructions, I1 and I2$t$, or I1 and I2$f$ are to be implemented, when a condition C is true or false, respectively, such as case 1 as follows.

Case 1: TEST(C); IF (C==1) THEN I2$t$ ELSE I2$f$

In this case, the microcontroller uses a code with a conditional GOTO instruction at a label and the ROM memory 110 would store file code lines, as shown in FIG. 4A.

Figure 4B:
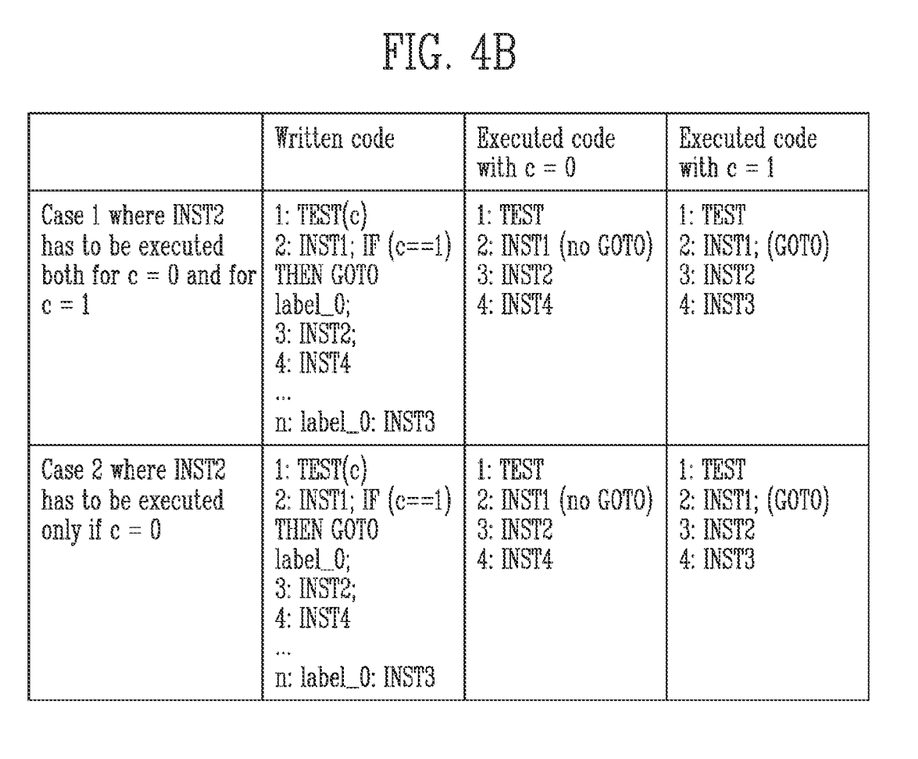

The statement "the subsequent instruction cannot be executed" is intended to mean that a certain algorithm with conditions (IF . . . THEN . . . in the below example) can or cannot be completely codified with jump instructions without internal NOP, i.e., by writing the code in such a way that the instruction written after a conditional jump is executed, from the algorithm viewpoint, irrespective of whether the jump is performed or not. If the programmer is not able to find a sequence of lines of code such as to allow taking advantage of the "jump without internal NOP" feature, then the instruction written after the jump instruction "cannot be executed", and in such a case it is possible to exploit the jump with internal NOP instruction, without having to explicitly write the NOP in the code, as shown in FIG. 4B.

In case 1, the instruction written in the line of code immediately under the jump instruction without internal NOP instruction (instruction INST2 in the example) is executed, irrespective of whether the jump instruction is performed or not, INST2 is a subsequent instruction.

In contrast, in case 2, the subsequent instruction (INST2) written after the jump instruction with internal NOP instruction is executed according to whether the jump instruction is performed or not. Plush, the internal NOP instruction is executed when the execution of the instruction (INST2) is skipped.

In particular, it can be verified that the ROM memory 110 comprises file code lines, both in a case the microcontroller with the signal MC_MICRO_INTNOP_SKIP of FIG. 3A, indicated as Micro 1, and in a case the controller with duplicated jump instructions, indicated as Micro 2, according to an embodiment of the method described above.

It should be noted that Micro 1 and Micro 2 have a same number of code lines and need the same number of clock cycles.

Since the microcontroller is able to simultaneously execute up to two sub-instructions for each clock cycle, in case a number of instructions higher than two are to be executed, the same are subdivided according to two different groupings being able to be simultaneously executed, as shown in FIG. 4A as Case 2, which provides for the execution of instructions I0, I1 and I2, being I2 a conditional instruction. In the example of FIG. 4A, the instruction I0 and TEST(C) instruction as well as the instruction I1 and the GOTO instruction can be simultaneously executed.

It can be thus verified that the file code lines Micro 2 still comprises four code lines to be executed in three clock cycles for a condition C being true and four clock cycles for a condition C being false, while Micro 1 comprises five code lines, a NOP instruction having been inserted, to be executed in four clock cycles, independently from the condition C.

It should be noted that, even if the code line "I1; IF (C==1) THEN GOTO I_true;" is divided into two lines "IF (C==1) THEN GOTO I_true;" followed by "I1" so as to remove the NOP operation, the number of code lines and the clock cycles needed would be the same.

According to an embodiment, by duplicating all the jump instructions, a best working mode is achieved for Micro 2, having a same execution speed (Case 1) and a lower code lines number (Case 2).

It should be noted that the method according to the embodiment processes and decodes a greater number of instructions, due to the presence of the duplicated jump instructions. It is thus clear that Micro 2, implementing such a method, comprises a decoder with a greater area with respect to Micro 1, the decoder area being tied to the number of instructions to be decoded. Moreover, in case the bit length of the instruction is increased, a corresponding increasing of the memory area wherein the instruction are stored occurs, being a ROM memory or a RAM memory.

For instance, for a code comprising 16 jump instructions over a total number of 46 instructions, according to the method of the embodiment, a total number of 62 instructions are processed, i.e., a significant increased total number of instructions.

Figure 5:
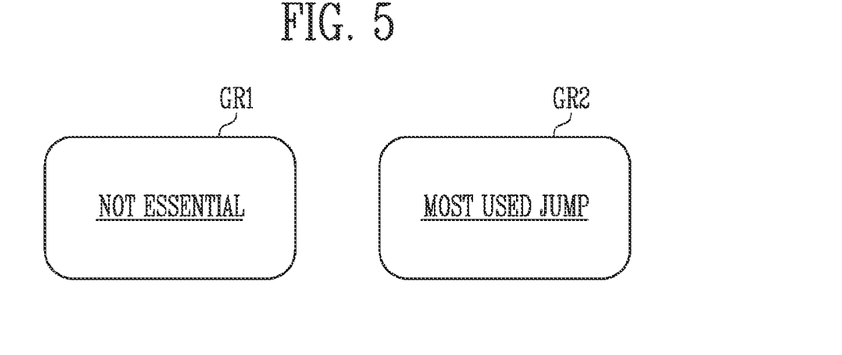
FIG. 5 schematically illustrates a grouping of instructions performed by the method according to an embodiment of the present disclosure.

Hence, according to an embodiment, the method comprises the identification of: a first group of instructions GR1 including the instructions that are nonessential, in particular the unused instructions or the instructions being called a limited number of time and that can be substituted without affecting the correct working of the microcontroller; and a second group of instructions GR2 including the jump instructions that are mostly used, as schematically shown in FIG. 5.

The method according to the embodiment further comprises duplicated instructions of the second group GR2 and an inserted one jump instruction of such second group GR2 in place of an instruction of the first group GR1 of nonessential instructions, to obtain a new instruction set having a reduced number of duplicated jump instructions with respect to the previous embodiment. In this way, an internal NOP instruction is removed after a jump instruction that causes the NOP instruction. A microcontroller with a reduced number of duplicated jump instructions, in accordance with the method according to the embodiment described above, is also indicated as Micro 3.

It can be verified that the selection of the jump instructions to be duplicated and the nonessential instructions to be removed, for instance the unused instructions, is dependent on the particular case analyzed. The code lines of the nonessential instructions are in any case used to code the added jump instructions.

The new instruction set having a reduced number of duplicated jump instructions allows for a clear reading of the code and simplification of the evaluation of its behavior.

The method according to an embodiment compromises between the number of code lines, the execution speed and the area occupation of the microcontroller, by tuning the number of jump instructions to be duplicated. In particular, it can be verified that the file code lines Micro 3 with the new instruction set having a reduced number of duplicated jump instructions, applied on read and program code only, still shows a saving of code lines, even if lower with respect to the file code lines Micro 2, while maintaining an area occupation and an execution time in line with the file code lines Micro 1.

According to an embodiment of the present disclosure, the new instruction set, as obtained by identifying the first group GR1 of nonessential instructions and inserting one jump instruction of the second group GR2 of most used jump instructions in place of an instruction of the first group GR1 is combined with using an internal NOP signal in order to manage the NOP instructions.

Figure 6:
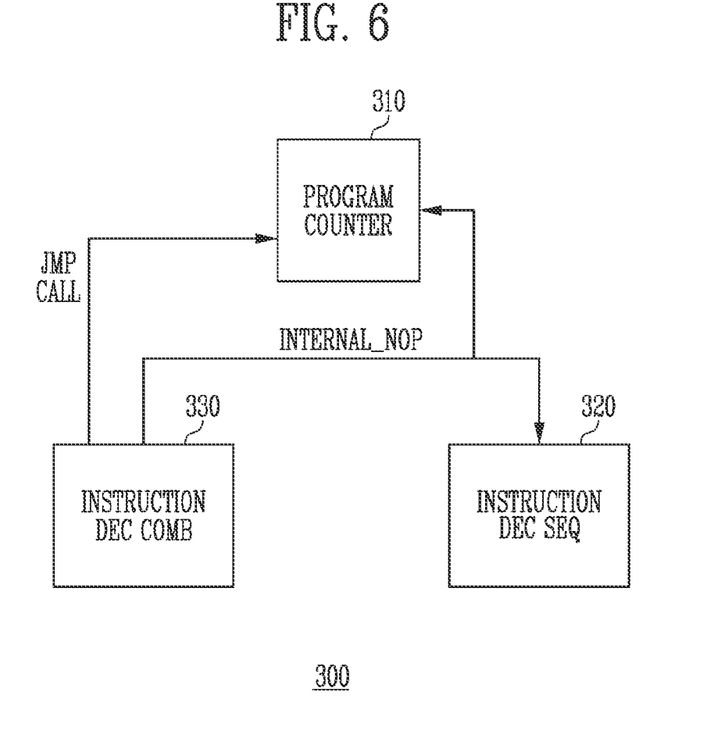
FIGS. 6 and 7 schematically show a block diagram corresponding to the managing of a NOP instruction according to an embodiment of the present disclosure and to a prior art solution, respectively.

More particularly, as shown in FIG. 6, an internal NOP code signal INTERNAL_NOP is provided both to a program counter block 310 and an instruction decoder sequence block 320 of the microcontroller performing the method.

In this way, an internal managing unit 300 is provided within the microcontroller; which comprises the program counter block 310 and the instruction decoder sequence block 320 as well as an instruction decoder combiner block 330, suitably modified to provide the internal NOP code signal INTERNAL_NOP to the program counter block 310 and to the instruction decoder sequence block 320 as well as a jump call to the program counter block 310.

Figure 7:
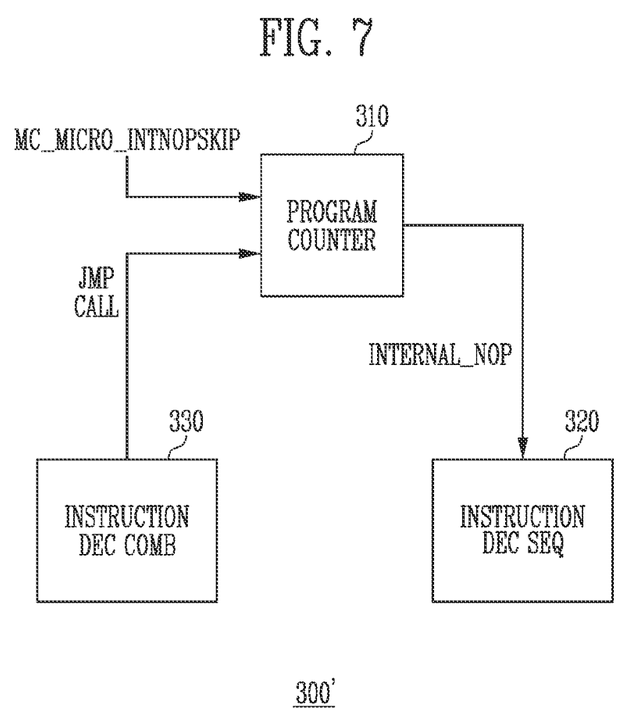

A previous configuration of an internal managing unit 300' using the externally provided skipping signal MC_MICRO_INTNOP_SKIP is shown in FIG. 7, such a known internal managing unit 300' comprising the program counter block 310 which receives the skipping signal MC_MICRO_INTNOP_SKIP from the output port of the microcontroller skip circuit 200, as previously described and provides an internal NOP code signal INTERNAL_NOP to the instruction decoder sequence block 320, while the instruction decoder combiner block 330 only provides the JMP or CALL flag to the program counter block 310.

In such a previous configuration of the internal managing unit 300', the internal NOP code signal INTERNAL_NOP is driven high by the jump flags whenever a jump instruction is being decoded inside the instruction decoder combiner block 330. However, if the skipping signal MC_

MICRO_INTNOP_SKIP is set, such an internal NOP code signal INTERNAL_NOP is masked to zero.

The skipping signal MC_MICRO_INTNOP_SKIP is used to remove a NOP instruction after a jump instruction that has caused such a NOP instruction.

It can be verified that the association of an internal NOP code signal INTERNAL_NOP and the new instruction set allows to save code lines, the algorithm with the new instruction set having the same execution time as the one being not modified according to the method.

Figure 8:
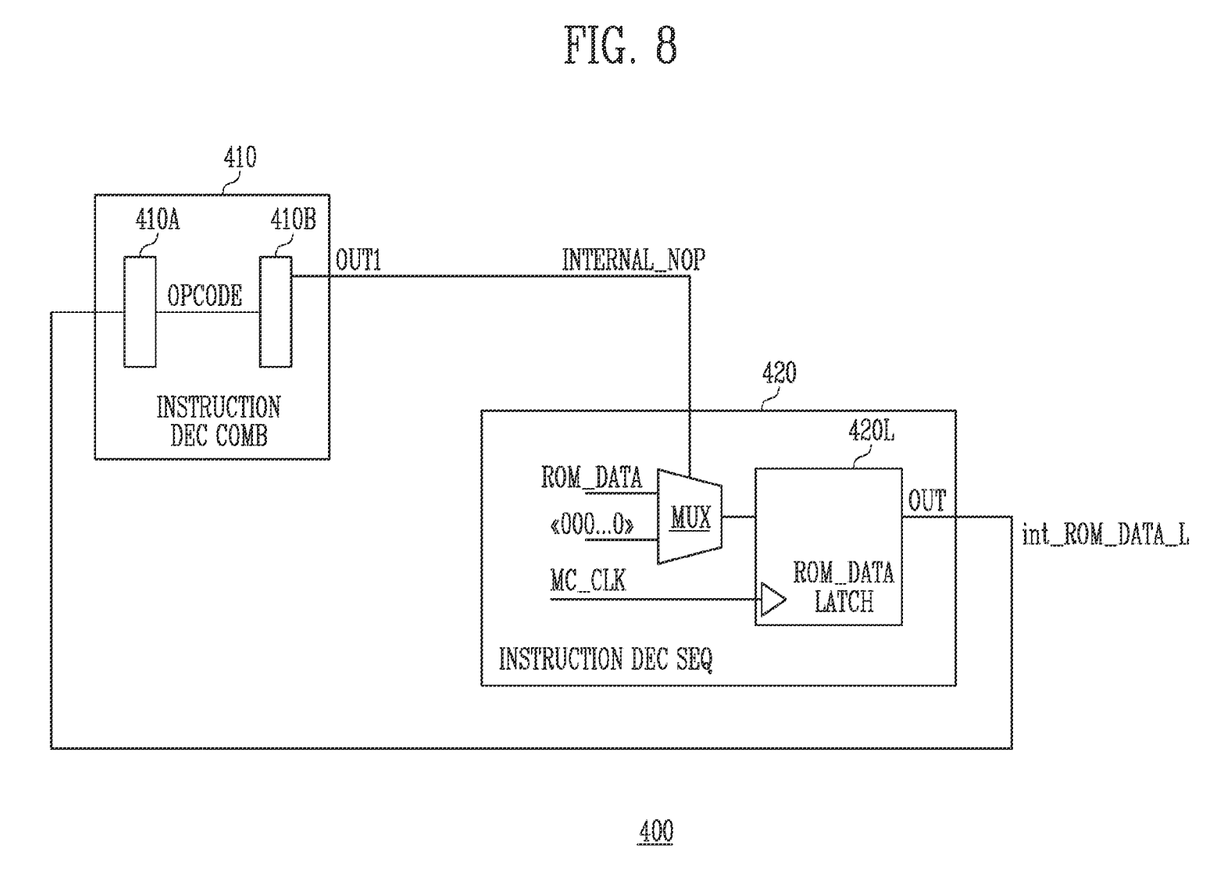
FIG. 8 schematically shows a block diagram of a microcontroller portion for managing a NOP instruction according to an embodiment of the present disclosure.

A block diagram of a NOP manager unit of a microcontroller using a combination of the instruction decoder combiner block providing the internal NOP code signal INTERNAL_NOP to the instruction decoder sequence block is shown in FIG. 8.

In particular, the NOP manager unit 400 comprises an instruction decoder combiner block 410 having an input portion 410A connected to an output terminal OUT of the NOP manager unit 400 and providing an operation code OPCODE to an output portion 410B of the instruction decoder combiner block 410, in turn providing at an internal output terminal OUT1 an internal NOP code signal INTERNAL_NOP.

The NOP manager unit 400 further comprises an instruction decoder sequence block 420 receiving the internal NOP code signal INTERNAL_NOP from the instruction decoder combiner block 410 and a dock signal MC_CLK of the microcontroller comprising the NOP manager unit 400. More particularly, the instruction decoder sequence block 420 comprises a MUX having a first input terminal receiving the memory instructions ROM_DATA and a second input terminal receiving an idle instruction NOP 000 . . . 0.0 and being driven by the internal NOP code signal INTERNAL_NOP received from the internal output terminal OUT1 of the instruction decoder combiner block 410. The instruction decoder sequence block 420 also comprises a ROM DATA latch 420L which receives the clock signal MC_CLK as well as an output signal of the MUX and is connected to the output terminal OUT of the NOP manager unit 400 and provides an internal memory instruction int_ROM_DATA_L.

In particular, in case an instruction needs a JUMP, the internal s NOP code signal INTERNAL_NOP is set to 1 and the MUX of the instruction decoder sequence block 420 is set to idle.

Figure 9:
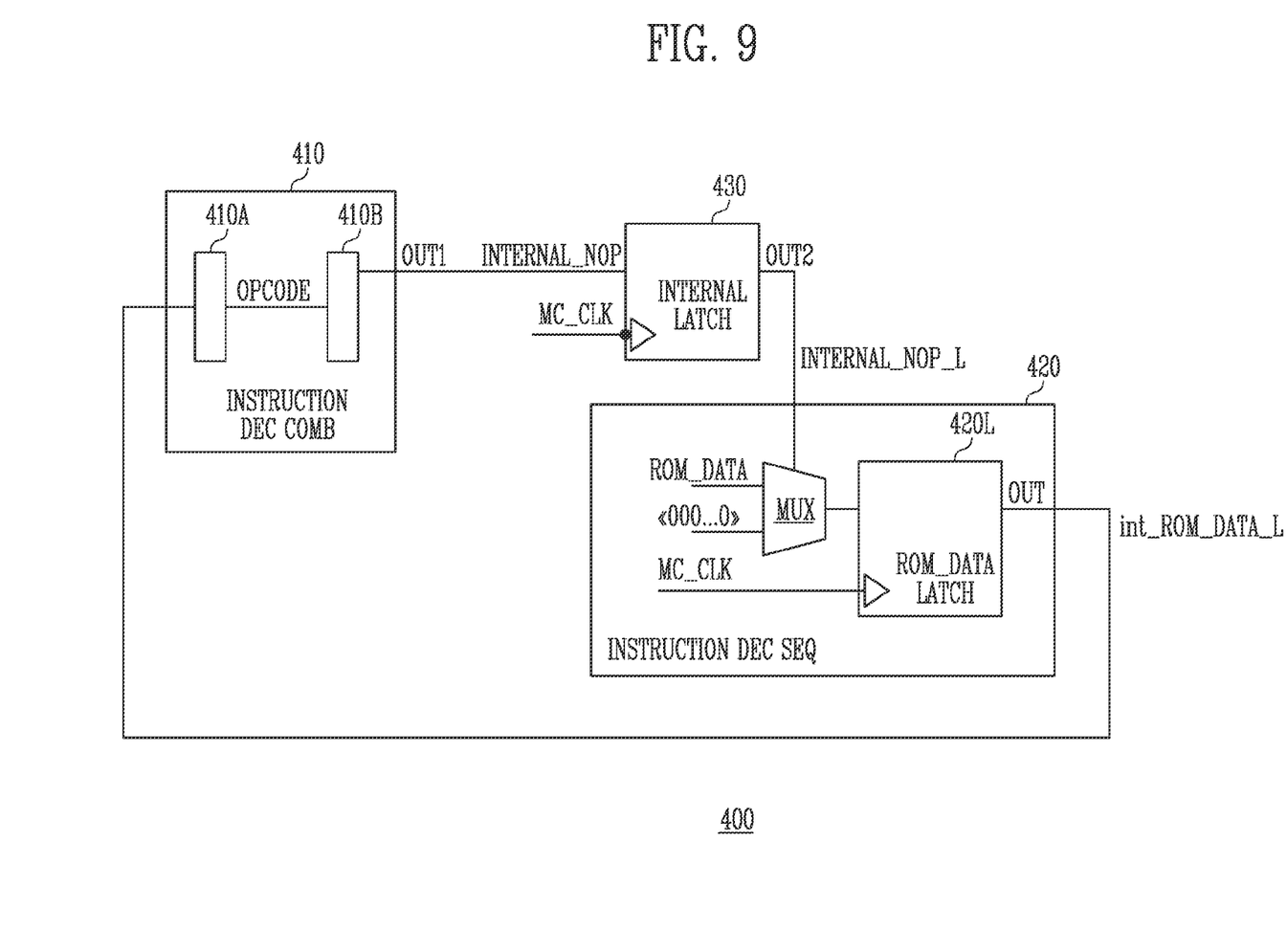
FIG. 9 schematically shows a block diagram of a microcontroller portion for managing a NOP instruction according to an alternative embodiment of the present disclosure.

Alternatively, as shown in FIG. 9, the NOP manager unit 400 may further comprise an additional internal latch 430, inserted between the internal output terminal OUT1 of the instruction decoder combiner block 410 and the instruction latch 420, the additional internal latch 430 receiving the clock signal MC_CLK of the microcontroller and providing at a further internal output terminal OUT2 a further internal NOP code signal INTERNAL_NOP_L to the instruction decoder sequence block 420, which in turn is connected to the output terminal OUT of the NOP manager unit 400 and provides the internal memory instruction int_ROM_DATA_L. More particularly, it should be noted that the additional internal latch 430 is sampling at the negative edge of the clock signal MC_CLK.

According to this alternative embodiment, possible glitches of the internal NOP code signal INTERNAL_NOP are deleted.

Figure 10A:
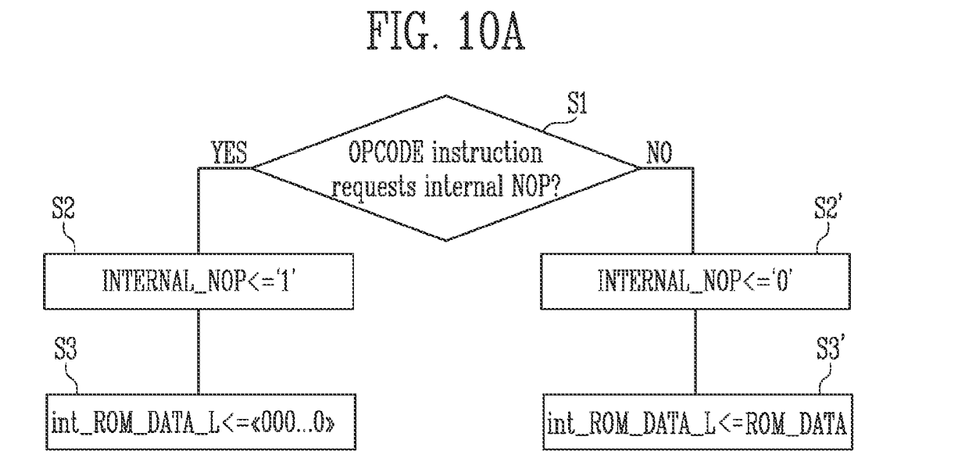
FIGS. 10A-10C schematically show a flow chart of the method for managing a NOP instruction according to an embodiment of the present disclosure and corresponding time diagrams of the plurality of internal instructions of the controller using the method.
Figure 10B:
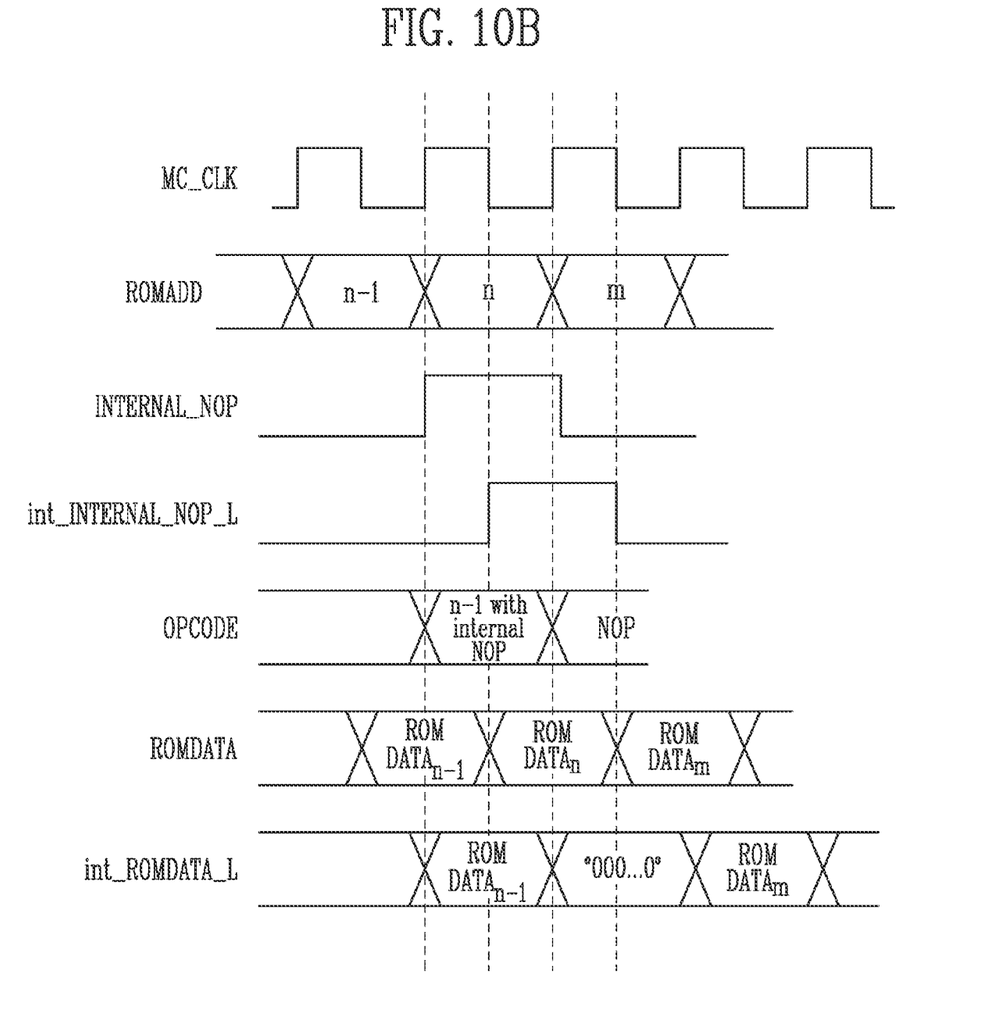
Figure 10C:
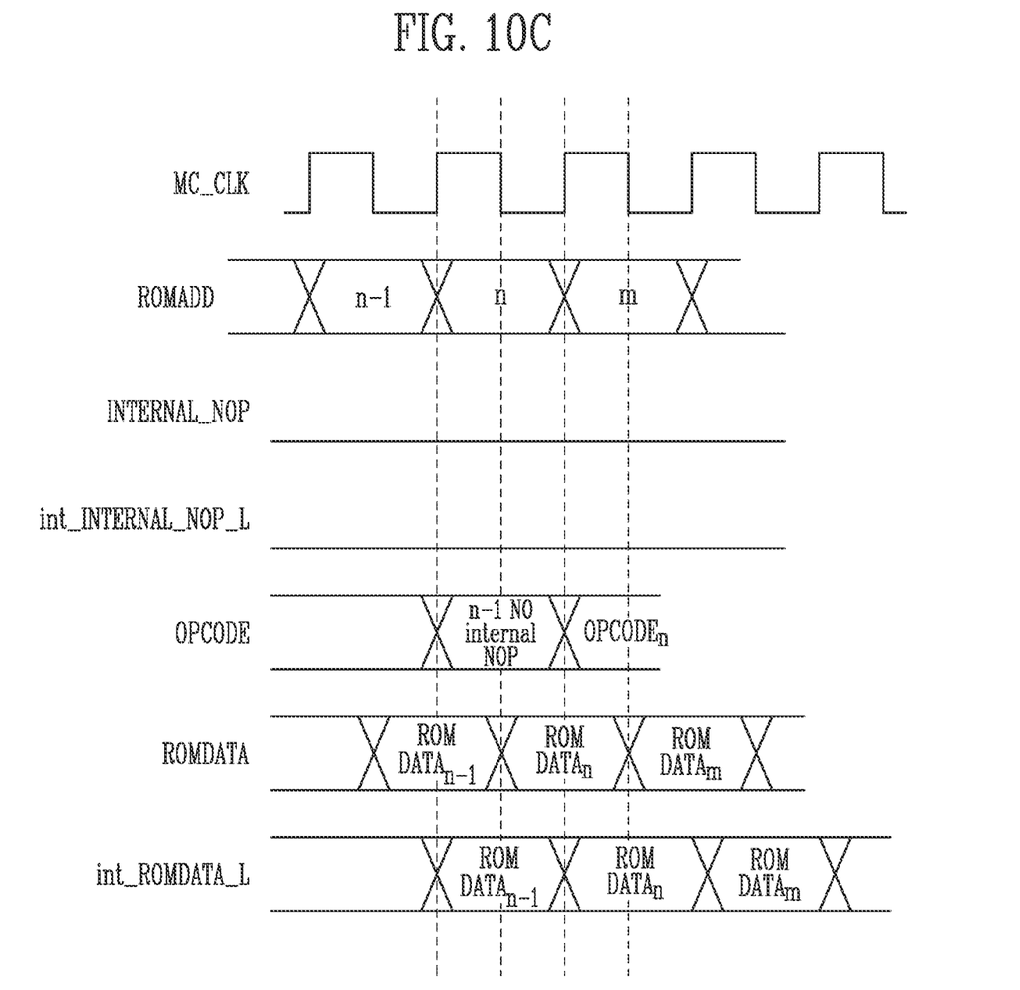

Making reference to this latter embodiment, the flow chart and corresponding timing diagrams of the working of the NOP manager unit 400 are shown in FIGS. 10A, 10B and 10C, respectively.

In particular, at a first operation S1, the operation code OPCODE is verified in order to check if an internal NOP instruction is required. In case of an affirmative response (YES) to the verification of first operation S1, a second operation S2 is performed, setting the internal NOP code signal INTERNAL_NOP equal to 1 and a subsequent third operation S3 sets the internal memory instruction int_ROM_DATA_L equal to the idle instruction NOP 0000 . . . 0, the corresponding changes results in signals corresponding to the rising and falling edges of the clock signal MC_CLK being shown in FIG. 10B.

Dually, in case of an negative response (NO) to the verification of first operation S1, an alternative second operation S2' is performed, setting the internal NOP code signal INTERNAL_NOP equal to 0 and a subsequent alternative third operation S3' sets the internal memory instruction int_ROM_DATA_L equal to the memory instructions ROM_DATA, the corresponding changes results in signals corresponding to the rising and falling edges of the clock signal MC_CLK being shown in FIG. 10C.

With the aforementioned method and microcontroller, a high performance management of the NOP instructions is obtained, without wasting and even saving code lines while guaranteeing an unaltered execution time, thus overcoming the problems tied to incurring of NOP instructions when the microcontroller operates.

Moreover, according to an embodiment, a suitable compromise between the number of lines code, the execution speed and the area occupation is achieved by tuning the number of jump instructions to be duplicated.

From the foregoing it will be appreciated that, although specific embodiments of the invention have been described herein for purposes of illustration, various modifications may be made without deviating from the spirit and scope of the invention. Accordingly, the invention should not be limited except according to the following appended claims.

What is claimed is:

1. A method for managing of NOP instructions in a microcontroller, the method comprising:
   duplicating all jump instructions causing a NOP instruction to form a new instruction set;
   inserting an internal NOP instruction into each of the jump instructions;
   when a jump instruction is executed, executing a subsequent instruction of the new instruction set; and
   executing the internal NOP instruction when an execution of the subsequent instruction is skipped.

2. The method of claim 1,
   wherein executable instructions of the new instruction set are sub-divided into a plurality of sub-sets including output modification instructions, logic-algebraic instructions and flow instructions, and
   wherein the microcontroller simultaneously executes two instructions of different sub-sets.

3. The method of claim 2, wherein each code line including more than two instructions is subdivided into two line code including two instructions of two different sub-sets, within the new instruction set.

* * * * *